(12) United States Patent
Cheng et al.

(10) Patent No.: US 9,523,981 B2
(45) Date of Patent: Dec. 20, 2016

(54) METHOD AND DEVICE FOR MONITORING THE NUMBER OF SHEETS IN DRYING OVEN, AND MANAGEMENT AND CONTROL SYSTEM OF DRYING OVEN

(71) Applicants: BOE TECHNOLOGY GROUP CO., LTD., Beijing (CN); HEFEI XINSHENG OPTOELECTRONICS TECHNOLOGY CO., LTD, Hefei, Anhui (CN)

(72) Inventors: Dafu Cheng, Beijing (CN); MinGting Weng, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/382,371

(22) PCT Filed: Dec. 4, 2013

(86) PCT No.: PCT/CN2013/088557
§ 371 (c)(1),
(2) Date: Sep. 2, 2014

(87) PCT Pub. No.: WO2014/190706
PCT Pub. Date: Dec. 4, 2014

(65) Prior Publication Data
US 2016/0070259 A1 Mar. 10, 2016

(30) Foreign Application Priority Data
May 31, 2013 (CN) .......................... 2013 1 0214451

(51) Int. Cl.
*G05B 23/02* (2006.01)
*G05B 23/00* (2006.01)
(Continued)

(52) U.S. Cl.
CPC ............... *G05B 23/00* (2013.01); *F26B 25/00* (2013.01); *F26B 25/001* (2013.01); *F26B 25/004* (2013.01); *F26B 25/22* (2013.01)

(58) Field of Classification Search
CPC ........... B65G 1/00; F26B 25/001; G05B 23/00
See application file for complete search history.

(56) References Cited

U.S. PATENT DOCUMENTS

| 2003/0065421 A1* | 4/2003 | Didriksen | B65G 1/00 700/230 |
| 2004/0076495 A1* | 4/2004 | Henderson | B23K 1/0016 414/160 |
| 2013/0039543 A1* | 2/2013 | Fuhr | G06Q 10/087 382/103 |

FOREIGN PATENT DOCUMENTS

| CN | 101006562 A | 7/2007 |
| CN | 101443899 A | 5/2009 |

(Continued)

OTHER PUBLICATIONS

First Office Action issued by the Chinese Patent Office for Chinese Patent Application No. 201310214451.0 dated Jan. 29, 2015, six (6) pages.

(Continued)

*Primary Examiner* — Omeed Alizada (57) ABSTRACT

A method and a device for monitoring the number of sheets in a drying oven and a management and control system of the drying oven are disclosed. The method for monitoring comprises: acquiring sheet inlet signals and sheet outlet signals during transmission of the sheets (S100), in which the sheet inlet signals include information about a number of (Continued)

sheets transmitted into the oven by a robot, and the sheet outlet signals include information about a number of sheets transmitted out of the oven by the robot; and calculating an actual number of sheets in the oven according to the sheet inlet signals and the sheet outlet signals (S200). Moreover, the monitoring device (1) comprising an acquisition module (11) and a calculation module (12) is disclosed, and the management and control system of a drying oven, comprising the above device, is disclosed. The monitoring method is not affected by the alarm of the robot and the oven, is simple and accurate in counting, and has cost advantage compared with a method for sensing a sensor.

14 Claims, 5 Drawing Sheets

(51) Int. Cl.
    *F26B 25/00*    (2006.01)
    *F26B 25/22*    (2006.01)

(56) References Cited

FOREIGN PATENT DOCUMENTS

| CN | 1017152589 A | 5/2010 |
|---|---|---|
| CN | 101770227 A | 7/2010 |
| CN | 102686043 A | 9/2012 |
| CN | 103293981 A | 9/2013 |
| WO | 2005082550 A1 | 9/2005 |

OTHER PUBLICATIONS

English translation of First Office Action issued by the Chinese Patent Office for Chinese Patent Application No. 201310214451.0 dated Jan. 29, 2015, five (5) pages.
PCT International Search Report dated Mar. 4, 2014, fourteen (14) pages.
English abstract of CN101770227A, one (1) page.
English abstract of CN103293981A, two (2) pages.
PCT Written Opinion for international application No. PCT/CN2013/088557, dated Apr. 3, 2014; 5 pages.
English Abstract of CN101006562A dated Jul. 25, 2007 (listed above under Foreign Patent Documents); 2 pages.
English Abstract of CN101443899A dated May 27, 2009 (listed above under Foreign Patent Documents); 2 pages.
English Abstract of CN102686043A Sep. 19, 2012 (listed above under Foreign Patent Documents); 2 pages.
English Abstract of CN101715289A dated May 26, 2010 (listed above under Foreign Patent Documents); 2 pages.
English Abstract of WO2005082550A1 dated Sep. 9, 2005 (listed above under Foreign Patent Documents); 2 pages.
PCT International Preliminary Report on Patentability for international application PCT/CN2013/088557, dated Dec. 1, 2015 with English translation of PCT Written Opinion dated Apr. 3, 2014; 8 pages.

\* cited by examiner

METHOD AND DEVICE FOR MONITORING THE NUMBER OF SHEETS IN DRYING OVEN, AND MANAGEMENT AND CONTROL SYSTEM OF DRYING OVEN

CROSS REFERENCE TO RELATED APPLICATIONS

This application is based on International Application No. PCT/CN2013/088557 filed on Dec. 4, 2013, which claims priority to Chinese National Application No. 201310214451.0 filed on May 31, 2013. The entire contents of each and every foregoing application are incorporated herein by reference.

TECHNICAL FIELD

Embodiments of the present invention relate to a method and a device for monitoring the number of sheets in a drying oven and a management and control system of the drying oven.

BACKGROUND

The process of manufacturing electronic components, for instance, the process of manufacturing display substrates, generally comprises the step of drying glass substrates in a drying oven. During the transmission of glass substrates by a robot, when interactive signals are disconnected due to the alarm of the robot or the oven, the inaccurate value of the amount of the number of glass substrates existing in the drying oven tends to occur. For instance, in the case where the robot takes out an substrate (substrates) while the alarm of the robot occurs at the same time, the robot does not act due to signal interrupt (namely there is no sheet taken out of the oven and therefore the oven is still kept in the full-sheet state), but the existence value of the number of glass substrates in the oven will be reduced by a corresponding amount of the glass substrate(s) in response to the action of the robot, and hence an inaccurate count of the existence value of the number of glass substrates in the oven will occur. At this point, if a processor starts a device without confirming the condition of inventories in the oven, the device will wrongly determine that the existence value of the number of glass substrates in the oven is less than the maximum filling value of the glass substrates in the oven, and hence the robot will continuously transmit the glass substrates into the oven, and consequently the risk of breakage will be greatly increased.

At present, the phenomenon of sheet breakage in the oven is usually prevented by the mounting of a sensor, but the cost is relatively high. Taking the one drop filling (ODF) technology as an example, the cost of mounting the sensor is approximately RMB 720,000 for each production line, and hence the cost is too high.

SUMMARY

Embodiments of the present invention provide a method and a device for monitoring the number of sheets in a drying oven and a management and control system of the drying oven, capable of simply and accurately monitoring the number of glass substrates in the oven and effectively avoiding the problem of sheet breakage due to the dismatch of inventory number.

In one aspect, the present invention provides a method for monitoring the number of sheets in a drying oven, which comprises: acquiring sheet inlet signals and sheet outlet signals during transmission of the sheets, in which the sheet inlet signals include information about a number of sheets transmitted into the oven by a robot, and the sheet outlet signals include information about a number of sheets transmitted out of the oven by the robot; and calculating the actual number of glass substrates in the oven according to the sheet inlet signals and the sheet outlet signals.

For instance, the step of acquiring the sheet inlet signals and the sheet outlet signals during the transmission of the sheets may be as follows: the sheet inlet signals and the sheet outlet signals are extracted from interactive signals between the robot and the oven.

For instance, the method for monitoring the number of sheets in the oven may further comprise: displaying the actual number of sheets in the oven, obtained through the calculation.

For instance, before the step of calculating the actual number of sheets in the oven according to the sheet inlet signals and the sheet outlet signals, the method may further comprise: acquiring corresponding sheet inlet signals and corresponding sheet outlet signals of different ovens according to the types of the ovens.

For instance, the sheet inlet signals include a sheet inlet signal of a sealant hardening furnace, a single-sheet inlet signal of a cleaner-followed drying oven, and a double-sheet inlet signal of the cleaner-followed drying oven; and the sheet outlet signals include a sheet outlet signal of the sealant hardening furnace, a single-sheet outlet signal of the cleaner-followed drying oven, and a double-sheet outlet signal of the cleaner-followed drying oven.

For instance, the step of calculating the actual number of glass substrates in the oven according to the sheet inlet signals and the sheet outlet signals may be as follows: when the oven is a sealant hardening furnace, the actual number of sheets in the oven=the number of sheets recorded in a sheet inlet signal of the sealant hardening furnace−the number of sheets recorded in a sheet outlet signal of the sealant hardening furnace.

For instance, the step of calculating the actual number of sheets in the oven according to the sheet inlet signals and the sheet outlet signals may be as follows: when the oven is a cleaner-followed drying oven, the actual number of sheets in the oven=the number of sheets recorded in a double-sheet inlet signal of the cleaner-followed drying oven×2−the number of sheets recorded in a double-sheet outlet signal of the cleaner-followed drying oven×2+the number of sheets recorded in a single-sheet inlet signal of the cleaner-followed drying oven−the number of sheets recorded in a single-sheet outlet signal of the cleaner-followed drying oven.

For instance, the monitoring method may further comprise: comparing a count value of the actual number of sheets in the oven with an existence value of the number of sheets in the oven, and executing a predetermined executive strategy according to a comparison result.

For instance, the step of executing the predetermined executive strategy according to the comparison result may be as follows: an inventory dismatch alarm is given when the count value of the actual number of sheets in the oven is not equal to the existence value of the number of sheets in the oven.

In another aspect, the present invention provides a device for monitoring the number of sheets in an oven, which comprises an acquisition module and a calculation module, wherein the acquisition module is configured to acquire sheet inlet signals and sheet outlet signals during transmission of the sheets, in which the sheet inlet signals include information about a number of sheets transmitted into the oven by a robot, and the sheet outlet signals include information about a number of sheets transmitted out of the oven by the robot; and the calculation module is configured to calculate the actual number of sheets in the oven according to the sheet inlet signals and the sheet outlet signals.

For instance, the device for monitoring the number of sheets in the oven may further comprise a determination module for determining corresponding sheet inlet signals and corresponding sheet outlet signals of different ovens according to the types of the ovens.

For instance, the device for monitoring the number of sheets in the oven may further comprise a display module for displaying the actual number of sheets in the oven, obtained through the calculation.

For instance, the monitoring device may further comprise an execution module for comparing a count value of the number of sheets in the oven and an existence value of the number of sheets in the oven and executing a predetermined executive strategy according to a comparison result.

In still another aspect, the present invention provides a management and control system of a drying oven, which comprises any forgoing monitoring device.

The method and the device provided by the embodiments of the present invention calculate the actual number of glass substrates in the oven according to the sheet inlet signals and the sheet outlet signals in the interactive signals between the robot and the oven during the transmission of the glass substrates, are not affected by the alarm of the robot or the oven, are simple and accurate in counting, and have cost advantage compared with a method for mounting a sensor.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In the process of manufacturing a liquid crystal display (LCD) panel, due to the disconnection of interactive signals between a robot and an oven caused by the alarm of the robot or the oven, the problem of inaccurate data of glass substrates (sheets) in the drying oven will be caused.

Figure 1:
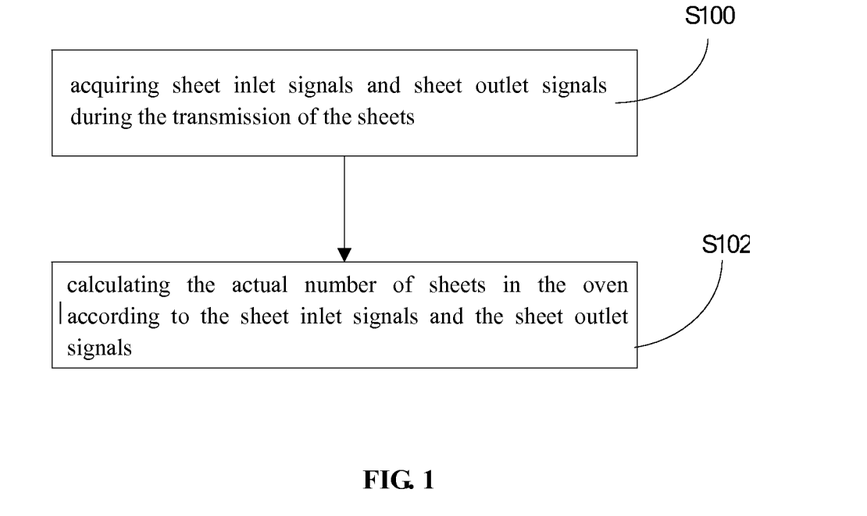
FIG. 1 is a basic flowchart of a method for monitoring the number of sheets in a drying oven provided by an embodiment of the present invention.

As illustrated in FIG. 1, an embodiment of the present invention provides a method for monitoring the number of sheets in a drying oven, which comprises:

step S100: acquiring sheet inlet signals and sheet outlet signals during transmission of the sheets; and step S102: calculating the actual number of sheets in the oven according to the sheet inlet signals and the sheet outlet signals.

The monitoring method provided by the embodiment monitors the sheets in the oven by using the sheet inlet signals and the sheet outlet signals during the transmission of the sheets, provides a basis for determining the condition of inventories in the oven, is not affected by the disconnection of the interactive signals between the robot and the oven, and is simple and accurate in counting. The sheets may be glass substrates or the like. For instance, the sheet inlet signals and the sheet outlet signals acquired in the step S100 are extracted from the interactive signals between the robot and the oven; the sheet inlet signals are generally the ready signals transmitted by the robot; and the sheet outlet signals are generally the signals received by the robot. In the sheet inlet signal, the number of sheets transmitted into the oven is recorded by a signal instruction (PLC Bit). If the PLC Bit in the sheet inlet signal is B, it indicates that the number of sheets to be transmitted into the oven is B. Meanwhile, in the sheet outlet signal, the number of sheets to be transmitted out of the oven may also be recorded by PLC Bit. For instance, if the PLC Bit in the sheet outlet signal is A, it indicates that the number of sheets to be transmitted out of the oven is A. When the sheet inlet signals and the sheet outlet signals are acquired, the number of sheets transmitted into the oven and the number of sheets transmitted out of the oven are actually known. In this way, the actual number of sheets in the oven may be easily obtained by subtracting the number of sheets transmitted out of the oven from the number of sheets transmitted into the oven.

An oven adopted in the process of manufacturing the LCD panel is usually a cleaner-followed drying oven (the drying oven after a cleaner) and a sealant hardening furnace. For instance, the main difference between the cleaner-followed drying oven and the sealant hardening furnace is as follows: in the cleaner-followed drying oven, not only one glass substrate can be transmitted through a robot but also two glass substrates can be transmitted together through the robot. The counting means of transmitting one glass substrate through the robot is the same as that of the sealant hardening furnace: for instance, if the sheet inlet number recorded in the sheet inlet signal is B and the sheet outlet number recorded in the sheet outlet signal is A, the count value is B−A. As for the counting means of transmitting two glass substrates together by the robot, if the above counting means is still adopted for counting, the count value will be reduced by one time. Therefore, the following formula is adopted for counting in the case of transmitting two glass substrates together by the robot: if the sheet inlet number recorded in the sheet inlet signal for the two glass substrates transmitted together by the robot is D and the sheet outlet number recorded in the sheet outlet signal for the two glass substrates is C, the count value should be D×2−C×2.

Figure 2:
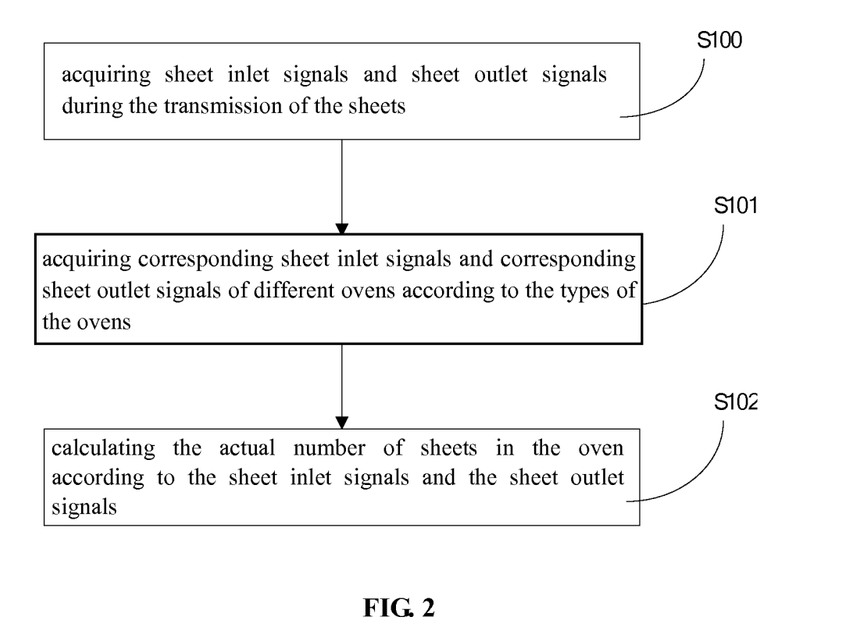
FIG. 2 is a flowchart of another method for monitoring the number of sheets in a drying oven provided by an embodiment of the present invention.

Therefore, in order to widen the application scope of the method for monitoring the sheets in the oven, as illustrated in FIG. 2, a method for monitoring the number of sheets in an oven provided by another embodiment, may comprise the following steps:

step S100: acquiring sheet inlet signals and sheet outlet signals during transmission of the sheets;

step S101: acquiring corresponding sheet inlet signals and corresponding sheet outlet signals of different ovens according to the types of the ovens; and step S102: calculating the actual number of sheets in the oven according to corresponding sheet inlet signals and corresponding sheet outlet signals of different ovens.

The difference between the embodiment and the previous embodiment is as follows: before the step of calculating the actual number of sheets in the oven according to the sheet inlet signals and the sheet outlet signals, corresponding sheet inlet signals and corresponding sheet outlet signals of different types of ovens needs be acquired; and the actual number of sheets in the oven is calculated by a corresponding computing formula that is selected according to the corresponding sheet inlet signals and the corresponding sheet outlet signals of different types of ovens. Therefore, the method for monitoring the number of sheets in the oven, provided by the present invention, not only can be applied to the sealant hardening furnace but also can be applied to the cleaner-followed drying oven by means of simple modification upon the computing formula; also, it is expected that it even can be further applied to other types of ovens. The sheet inlet signals and the sheet outlet signals of the robot of different ovens inevitably have some differences. The sheet inlet signal includes a sheet inlet signal of a sealant hardening furnace, a single-sheet inlet signal of a cleaner-followed drying oven, and a double-sheet inlet signal of the cleaner-followed drying oven; and the sheet outlet signals include a sheet outlet signal of the sealant hardening furnace, a single-sheet outlet signal of the cleaner-followed drying oven, and a double-sheet outlet signal of the cleaner-followed drying oven. If PLC Bit in the sheet inlet signal of the sealant hardening furnace is B, PLC Bit in the sheet outlet signal of the sealant hardening furnace is A, PLC Bit in the single-sheet inlet signal of the cleaner-followed drying oven is C, PLC Bit in the single-sheet outlet signal in the cleaner-followed drying oven is D, PLC Bit in the double-sheet inlet signal of the cleaner-followed drying oven is E, and PLC Bit in the double-sheet outlet signal of the cleaner-followed drying oven is F, then the number of sheets in the oven of the sealant hardening furnace is B−A, and the number of sheets in the oven of the cleaner-followed drying oven is E×2−F×2+C−D. The computing formula can be modified according to the type of the oven and the number of sheets transmitted by the robot. When one, two and three sheets may be transmitted by the robot of the oven, the computing formula is a triple-sheet inlet signal of the oven×3−a triple-sheet outlet signal of the oven×3+the double-sheet inlet signal of the oven×2−the double-sheet outlet signal of the oven×2+the single-sheet inlet signal of the oven−the single-sheet outlet signal of the oven . . . . The method for monitoring the number of sheets in the oven, provided by the embodiment of the present invention, may be applied to various types of ovens.

Figure 3:
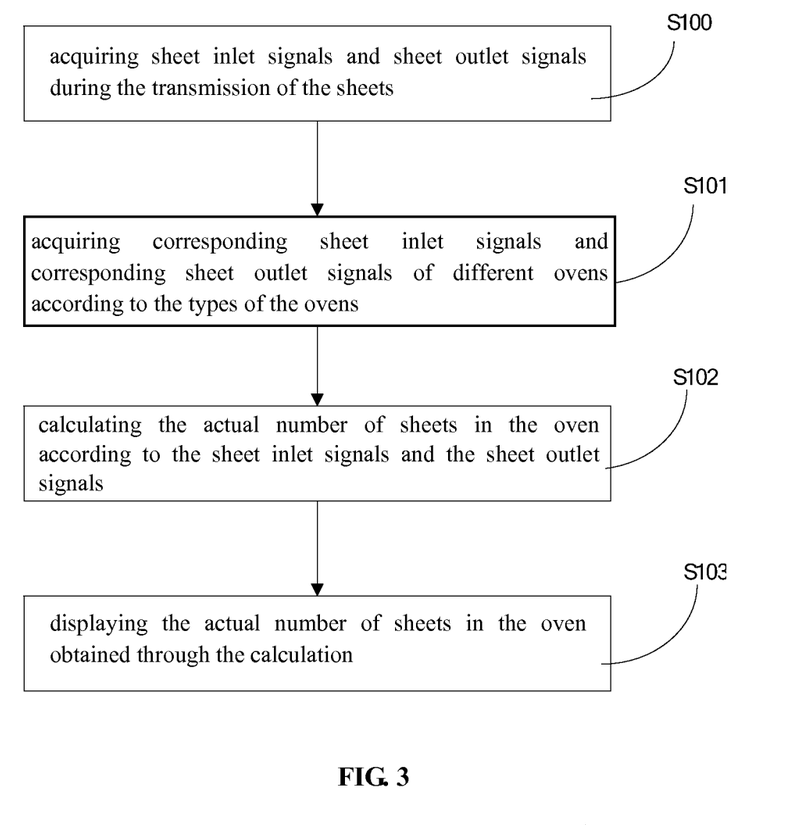
FIG. 3 is a flowchart of still another method for monitoring the number of sheets in a drying oven provided by an embodiment of the present invention.

For the purpose that a user can more directly view and clearly understand the number of sheets in the oven at the beginning, the result of the actual number of sheets in the oven, calculated through the above steps, may be also displayed in the monitoring method. As illustrated in FIG. 3, a method provided by another embodiment of the present invention comprises:

step S100: acquiring sheet inlet signals and sheet outlet signals during the transmission of sheets;

step S101: acquiring corresponding sheet inlet signals and corresponding sheet outlet signals of different ovens according to the types of the ovens;

step S102: calculating the actual number of sheets in the oven according to corresponding sheet inlet signals and corresponding sheet outlet signals of different ovens; and step S103: displaying the actual number of sheets in the oven obtained through the calculation.

Figure 4:
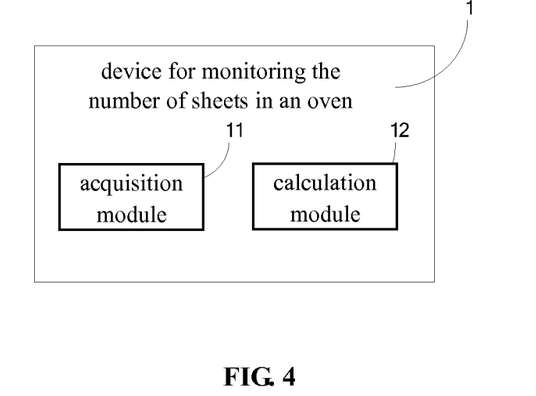
FIG. 4 is a schematic structural view of a device for monitoring the number of sheets in a drying oven provided by an embodiment of the present invention.

As illustrated in FIG. 4, a device 1 for monitoring the number of sheets in an oven, provided by one embodiment of the present invention, comprises an acquisition module 11 and a calculation module 12. The acquisition module 11 is configured to acquire sheet inlet signals and sheet outlet signals during the transmission of sheets; and the calculation module 12 is configured to calculate the actual number of sheets in the oven according to the sheet inlet signals and the sheet outlet signals.

The computing formula adopted by the calculation module 12 is predetermined according to the sheet inlet signals and the sheet outlet signals. The acquisition module 11 acquires the sheet inlet signals and the sheet outlet signals and sends the signals to the calculation module 12. For instance, if the sheet inlet number recorded by PLC Bit in the sheet inlet signal is B and the sheet outlet number recorded by PLC Bit in the sheet outlet signal is A, the predetermined computing formula in the calculation module 12 is B−A, namely the actual number of sheets in the oven is B−A.

For instance, the device for monitoring the number of sheets in the oven, provided by the embodiment, can calculate the number of sheets in the oven by using the sheet inlet signals and the sheet outlet signals in the interactive signals between the robot and the oven, so as to guarantee the counting accuracy of the sheets in the oven and avoid the problem of sheet breakage caused by the dismatch of the number of inventories in the oven.

Figure 5:
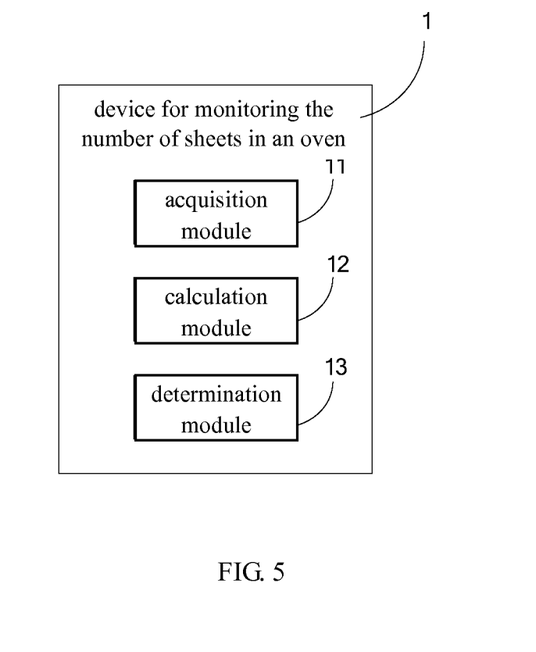
FIG. 5 is a schematic structural view of another device for monitoring the number of sheets in a drying oven provided by an embodiment of the present invention.

As illustrated in FIG. 5, a device 1 for monitoring the number of sheets in an oven, provided by one embodiment of the present invention, comprises an acquisition module 11, a calculation module 12 and a determination module 13. The acquisition module 11 is configured to acquire sheet inlet signals and sheet outlet signals during the transmission of the sheets; the determination module 13 is configured to determine corresponding sheet inlet signals and corresponding sheet outlet signals of different ovens according to the types of the ovens; and the calculation module 12 is configured to calculate the actual number of sheets in the oven according to the sheet inlet signals and the sheet outlet signals.

The difference between the monitoring devices provided by the embodiment and the above-mentioned embodiment is as follows: the monitoring device 1 further comprises the determination module 13. As different ovens have different sheet inlet signals and different sheet outlet signals, the number of sheets in the oven cannot be accurately calculated if all the sheet inlet signals and sheet outlet signals cannot be obtained and different computing formulas cannot be selected according to the differences of the sheet inlet signals and the sheet outlet signals. The determination module 13 is additionally arranged in the monitoring device, then all the sheet inlet signals and sheet outlet signals of the oven can be identified and corresponding computing formulas can be selected to calculate the number of sheets in the oven, so that the monitoring device provided by the embodiment is applicable to the count of the number of sheets in the ovens of various types.

Figure 6:
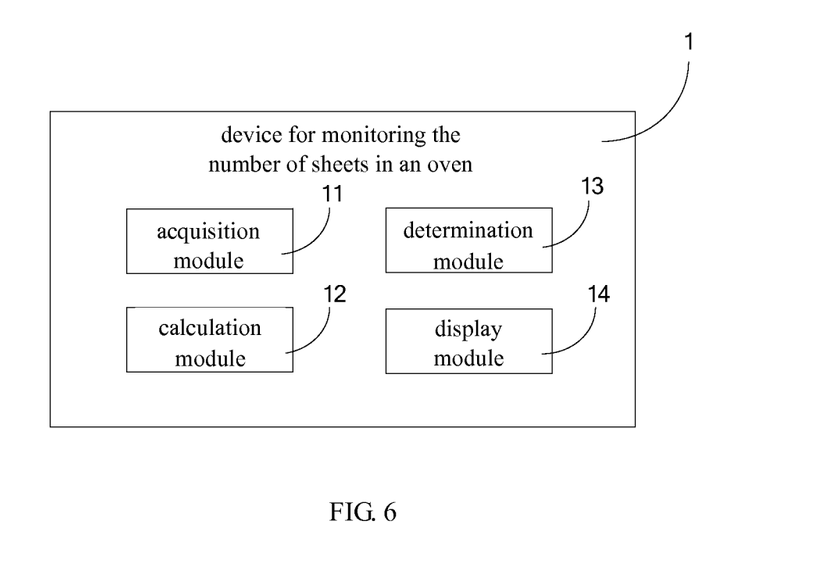
FIG. 6 is a schematic structural view of still another device for monitoring the number of sheets in a drying oven provided by an embodiment of the present invention.

A monitoring device provided by another embodiment of the present invention may also have a display function. As illustrated in FIG. 6, the device 1 for monitoring the number of sheets in the oven comprises an acquisition module 11, a calculation module 12, a determination module 13 and a display module 14. The acquisition module 11 is configured to acquire sheet inlet signals and sheet outlet signals during the transmission of the sheets; the determination module 13 is configured to determine corresponding sheet inlet signals and corresponding sheet outlet signals of different ovens according to the types of the ovens; the calculation module 12 is configured to calculate the actual number of sheets in the oven according to the sheet inlet signals and the sheet outlet signals; and the display module 14 is configured to display the actual number of sheets in the oven, obtained through the calculation.

The actual number of sheets in the oven, calculated by the calculation module 12, is sent to the display module 14 for display, so that the user can more directly know the number of inventories in the oven.

Figure 7:
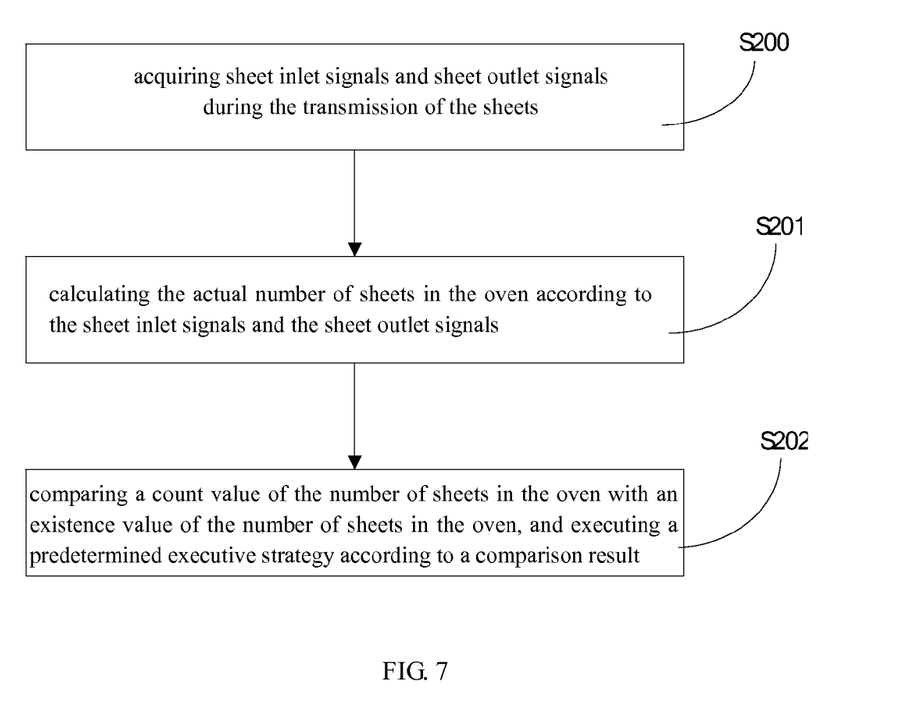
FIG. 7 is a basic flowchart of a method for monitoring the number of sheets in a drying oven provided by an embodiment of the present invention.

As illustrated in FIG. 7, a method for monitoring the number of sheets in an oven, provided by an embodiment of the present invention, comprises the following steps:

step S200: acquiring sheet inlet signals and sheet outlet signals during transmission of the sheets;

step S201: calculating the actual number of sheets in the oven according to the sheet inlet signals and the sheet outlet signals; and step S202: comparing a count value of the number of sheets in the oven with an existence value of the number of sheets in the oven, and executing a predetermined executive strategy according to a comparison result.

The count value of the number of sheets in the oven refers to the actual number of sheets in the oven, which is calculated according to the sheet inlet signals and the sheet outlet signals. The sheet inlet signals and the sheet outlet signals may be signals about "Door Open" and "Door Close" sent by the robot. For instance, in each case of sheet inlet, the robot sends the "Door Open" signal to the oven; and when the sheet inlet process ends and the robot is retracted, the robot sends the "Door Close" signal to the oven. The sheet inlet signals and the sheet outlet signals may also be signals executed by the oven. For instance, in each case of sheet inlet, the oven may execute the action of "Door Open" and "Door Close" once; and in the case of sheet outlet, the oven may also send or execute similar signals. In this way, the oven can determine the actual times of transmitting the sheets into the oven and the actual times of transmitting the sheets out of the oven according to the information, and hence the actual number of sheets in the oven, namely the count value of the number of sheets in the oven, can be obtained.

The existence value of the number of sheets in the oven refers to the number of sheets in the oven, which is displayed by the oven, and may also be obtained from the calculation by the oven. For instance, in the process of transmitting the sheets into the oven, the robot will send relevant information about the sheets to the oven, e.g., parameters such as dimension, thickness, material of the sheets and the like, and the oven can determine the number of sheets in the oven according to the times of receiving the relevant information of the sheets. The number is the existence value of the number of sheets in the oven.

In the operating process, if the robot stops action due to a fault at a certain moment during transmission, for instance, the robot is out of work but not enters the oven in the case of sheet inlet, at this point, "Door Open" information has not been sent or the oven has not executed the "Door Open" information, but the oven has received the relevant information about the sheets and hence will increase "the existence value of the number of sheets in the oven" by one, while "the count value of the number of sheets in the oven" is not changed, and in this case the problem of the inconsistency between the count value and the existence value will be caused.

The foregoing only enumerates the process of the inconsistency between the count value and the existence value where the robot stops action but not enters the oven in the case of sheet inlet. Actually, there are other cases of causing the inconsistency between the count value and the existence value. For instance, the robot stops action, and enters the oven but is not retracted, or failure occurs in any of the various stages when the robot retrieves the sheets (namely the sheets are transmitted out of the oven) . . . . The count value and the existence value may be also calculated according to the above principle.

In the method for monitoring the number of sheets in the oven, provided by the embodiments of the present invention, for instance, at first, the actual number of sheets in the oven is calculated by using the sheet inlet signals and the sheet outlet signals in the interactive signals between the robot and the oven; the count value of the number of sheets in the oven is compared with the existence value of the number of sheets in the oven, and whether the number of inventories in the oven is dismatched can be determined; if the count value of the number of sheets in the oven is consistent with the existence value of the number of sheets in the oven, it indicates that the number of sheets in the oven is matched, and the device can be started for operation; if the count value of the number of sheets in the oven is inconsistent with the existence value of the number of sheets in the oven, it indicates that the number of sheets in the oven is dismatched, and the device cannot be started immediately; and the problem of sheet breakage caused by the dismatch of inventories can be effectively avoided if the device is started after the dismatch problem of inventories is eliminated. The "inventory" in this disclosure refers to the sheets in the oven and the data of the sheets in the oven.

The inconsistency between the count value of the number of sheets in the oven and the existence value of the number of sheets in the oven involves two cases. One case refers to that the count value of the number of sheets in the oven is greater than the existence value of the number of sheets in the oven, an alarm must be given in this case to prevent the phenomenon of sheet breakage caused by the operation that the robot continuously transmits the sheets when the existence value of the number of sheets in the oven is inconsistent with the actual value although the sheets have been sent into each layer of the oven. The other case refers to that the count value of the number of sheets in the oven is less than the existence value of the number of sheets in the oven, in this case, an alarm may be given or may not be given and the device is directly started, and hence the working efficiency can be reduced and the phenomenon of sheet breakage will not occur even if the device is directly started. The alarm may be an audible alarm and/or a color alarm. For instance, the device is equipped with an alarm bell and an indicator light; when the count value of the number of sheets in the oven is inconsistent with the existence value of the number of sheets in the oven, the alarm bell gives out an audible alarm and the indicator light flashes red to show the dismatch of inventories of the device; and at this point, the user can disconnect the interaction between the robot and oven and check the condition of inventories in the oven. Before the step 201, the method for monitoring the number of sheets in the oven may further comprise: acquiring corresponding sheet inlet signals and corresponding sheet outlet signals of different ovens according to the types of the ovens; and after the step 201, the method may further comprise: displaying the count value of the actual number of sheets in the oven and the existence value of the number of sheets in the oven. As the above steps have been described in detail above, no further description will be given here.

Figure 8:
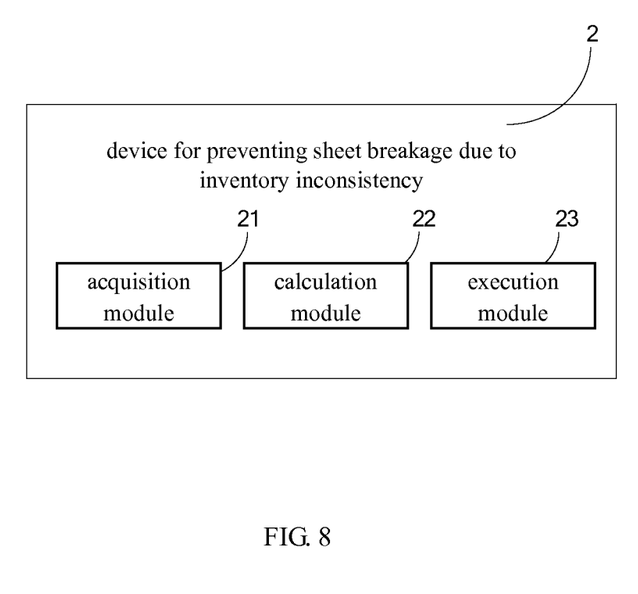
FIG. 8 is a schematic structural view of a device for monitoring the number of sheets in a drying oven provided by an embodiment of the present invention.

As illustrated in FIG. 8, a device 2 for monitoring the number of sheets in an oven, provided by an embodiment of the present invention, comprises an acquisition module 21, a calculation module 22 and an execution module 23. The acquisition module 21 is configured to acquire sheet inlet signals and sheet outlet signals during the transmission of the sheets; the calculation module 22 is configured to calculate the actual number of sheets in the oven according to the sheet inlet signals and the sheet outlet signals; and the execution module 23 is configured to compare a count value of the number of sheets in the oven with an existence value of the number of sheets in the oven, and execute a predetermined executive strategy according to a comparison result.

The count value of the number of sheets in the oven refers to the actual number of sheets in the oven, which is calculated by the calculation module 22 according to the sheet inlet signals and the sheet outlet signals, and the existence value of the number of sheets in the oven refers to the number of sheets in the oven, which is displayed by the oven. The existence value of the number of sheets in the oven will be inaccurately calculated due to the alarm of a robot or the oven. For instance, in the case of sheet outlet of the robot, the robot gives an alarm but does not carry out the original sheet outlet operation; but the oven will respond to the original sheet outlet operation of the robot and accordingly reduce the existence value of the number of sheets in the oven; and hence the existence value of the number of sheets in the oven will be inaccurate because it is affected by the alarm of the robot or the oven. The monitoring device provided by the embodiment of the present invention can achieve the accurate count of the number of sheets in the oven through software without additionally arranging hardware such as a sensor, can effectively prevent the problem of sheet breakage caused by the dismatch of inventories, and has cost advantages compared with a method with mounted sensors.

The present invention further provides a management and control system of a drying oven. The management and control system comprises the device for monitoring the number of sheets in the oven. As the device for monitoring the number of sheets in the oven has been described in detail above, no further description will be given here.

Detailed description will be also given below to the device, system and method provided by the embodiments for more clear illustration of the state simulation in various conditions in connection with preferable examples, in which glass substrates are used as the sheets. Data status and result status in the case of sheet inlet of the robot (namely when sheets are transmitted into the oven) are as shown in Table 1:

TABLE 1

| Glass Entity Position | Glass Data Position | Whether On exists in Send Ready Signal | Result |
| --- | --- | --- | --- |
| Robot | Robot | On | Oven Alarm |
| Oven | Robot | On | Robot Alarm + Oven Alarm |
| Robot | Oven | On | Robot Alarm |
| Oven | Oven | On | No Alarm, No Sheet Breakage |
| Robot | Robot | No On | No Alarm, No Sheet Breakage |
| Oven | Robot | No On | The Case does not Exist |
| Robot | Oven | No On | Oven Alarm |
| Oven | Oven | No On | The Case does not Exist |
| Robot | — | On | Robot Alarm + Oven Alarm |
| Oven | — | On | Oven Alarm |
| Robot | — | No On | Robot Alarm |
| Oven | — | No On | The Case does not Exist |

In the table, "Glass Entity Position" refers to the position at which the glass substrate is actually disposed, and "Glass Data Position" refers to the position of the glass substrate obtained according to the relevant information about the sheets received by the oven (e.g., dimension and thickness). That is to say, if the oven receives the dimension information of the glass substrate and the "Glass Entity Position" is "Robot", at this point the "existence value" is changed. "Whether On Exists in Send Ready Signal" refers to that a determination is made according to similar information such as "Door Open" received or executed by the oven; "On" indicates "having received or executed", and at this point the "count value" is changed. "Result" refers to the result status of the oven and the robot. In the case of inconsistency between the count value and the existence value of the current oven, the oven gives an alarm, namely "Oven Alarm", and the alarm will be stopped only if the two values are adjusted to be consistent by failure resolution or hidden-danger resolution. "Robot Alarm" has similar meaning.

Data status and result status in the case of sheet outlet of the robot (namely when sheets are transmitted out of the oven) are as shown in Table 2:

TABLE 2

| Glass Entity Position | Glass Data Position | Whether On Exists in Robot Data Received Signal | Result |
| --- | --- | --- | --- |
| Robot | Robot | On | No Alarm, No Sheet Breakage |
| Oven | Robot | On | Robot Alarm |
| Robot | Oven | On | The Case does not Exist |
| Oven | Oven | On | The Case does not Exist |
| Robot | Robot | No On | Oven Alarm |
| Oven | Robot | No On | Robot Alarm |
| Robot | Oven | No On | Robot Alarm |
| Oven | Oven | No On | No Alarm, No Sheet Breakage |
| Robot | — | On | The Case does not Exist |
| Oven | — | On | The Case does not Exist |
| Robot | — | No On | Robot Alarm |
| Oven | — | No On | Oven Alarm |

The meanings of the items in Table 2 can be interpreted with reference to Table 1.

Many functional components described in the description are all called modules in order to more particularly emphasize the independence of implementation.

In the embodiments of the present invention, the modules may be achieved by software so as to be executed by various types of processors. For example, a marked executable code module may include one or more physical or logical blocks of a computer instruction, and for instance, may be constructed as an object, a procedure or a function. Even so, executable codes of the marked module are not required to be physically located together but may include different instructions stored on different physical blocks. When the instructions are logically combined, a module is constructed and the predetermined object of the module is achieved.

Actually, the executable code module may include a single instruction or many instructions which may even be distributed on a plurality of different code segments, distributed in different programs, and distributed on a plurality of storage devices. Similarly, operational data may be identified in the module, achieved by any appropriate means and organized in any appropriate type of data structure. The operational data may be collected as a single data set or may be distributed at different positions (including the case of being distributed on different storage devices) and may at least partially exist on a system or a network by being only taken as electronic signals.

When the module can be achieved by software, in view of the level of the traditional hardware technology, those skilled in the art can establish corresponding hardware circuits on modules capable of being achieved by software to achieve corresponding functions regardless of the cost. The hardware circuits include conventional very large scale integration (VLSI) circuits or gate arrays and conventional semiconductors such as logic chips and transistors or other discrete elements. The module may also be achieved by programmable hardware units such as field programmable gate arrays, programmable logic arrays and programmable logical devices.

In the method provided by the embodiments of the present invention, the series numbers of the steps are not intended to limit the sequencing of the steps. It is obvious to those skilled in the art that the variation of the sequencing of the steps should also fall within the scope of protection of the present invention.

The foregoing is only the preferred embodiments of the present invention and not intended to limit the scope of protection of the present invention. The scope of protection of the present invention should be defined by the appended claims.

The invention claimed is:

1. A method for monitoring a number of sheets in a drying oven, comprising:
    acquiring sheet inlet signals and sheet outlet signals during transmission of the sheets, in which the sheet inlet signals include information about a number of sheets transmitted into the oven by a robot, and the sheet outlet signals include information about a number of sheets transmitted out of the oven by the robot; and
    calculating an actual number of sheets in the drying oven according to the sheet inlet signals and the sheet outlet signals,
    wherein before calculating the actual number of sheets in the drying oven according to the sheet inlet signals and the sheet outlet signals, the method further comprising: obtaining corresponding sheet inlet signals and corresponding sheet outlet signals of different ovens according to the types of the ovens.

2. The method for monitoring the number of sheets in the drying oven according to claim 1, wherein obtaining ready signals transmitted by the robot and the signals received by the robot from interactive signals between the robot and the oven as the sheet inlet signals and the sheet outlet signals, respectively.

3. The method for monitoring the number of sheets in the drying oven according to claim 1, further comprising: displaying the actual number of sheets in the drying oven that is obtained through the calculation.

4. The method for monitoring the number of sheets in the drying oven according to claim 1, wherein the sheet inlet signals include a sheet inlet signal of a sealant hardening furnace, a single-sheet inlet signal of a drying oven following a cleaner, and a double-sheet inlet signal of the drying oven following a cleaner; and the sheet outlet signals include a sheet outlet signal of the sealant hardening furnace, a single-sheet outlet signal of the drying oven following a cleaner, and a double-sheet outlet signal of the drying oven following a cleaner.

5. The method for monitoring the number of sheets in the drying oven according to claim 1, wherein when the oven is a sealant hardening furnace, the actual number of glass substrates in the drying oven=the number of glass substrates recorded in a sheet inlet signal of the sealant hardening furnace minus the number of glass substrates recorded in a sheet outlet signal of the sealant hardening furnace.

6. The method for monitoring the number of sheets in the drying oven according to claim 1, wherein when the oven is a drying oven following a cleaner, the actual number of glass substrates in the drying oven=a product of the number of glass substrates recorded in a double-sheet inlet signal of the drying oven following a cleaner multiplying 2 minus a product of the number of glass substrates recorded in a double-sheet outlet signal of the drying oven following a cleaner multiplying 2 plus the number of glass substrates recorded in a single-sheet inlet signal of the drying oven following a cleaner minus the number of glass substrates recorded in a single-sheet outlet signal of the drying oven following a cleaner.

7. The method for monitoring the number of sheets in the drying oven according to claim 1, further comprising:
    comparing a count value of the actual number of sheets in the drying oven with an existence value of the number of sheets in the drying oven, and executing a predetermined executive strategy according to a comparison result, wherein the predetermined executive strategy comprises giving an inventory mismatch alarm.

8. The method for monitoring the number of sheets in the drying oven according to claim 7, wherein the inventory mismatch alarm is given when the count value of the actual number of sheets in the drying oven is not equal to the existence value of the number of sheets in the drying oven.

9. A device for monitoring the number of sheets in a drying oven, comprising an acquisition module and a calculation module, wherein
    the acquisition module is configured to acquire sheet inlet signals and sheet outlet signals during transmission of the sheets, in which the sheet inlet signals include information about a number of sheets transmitted into the oven by a robot, and the sheet outlet signals include information about a number of sheets transmitted out of the oven by the robot; and
    the calculation module is configured to calculate an actual number of sheets in the drying oven according to the sheet inlet signals and the sheet outlet signals,
    the device further comprising a determination module configured for determining corresponding sheet inlet signals and corresponding sheet outlet signals of different ovens according to the types of the ovens.

10. The device for monitoring the number of sheets in the drying oven according to claim 9, further comprising a display module configured for displaying the actual number of sheets in the drying oven, obtained through the calculation.

11. The device for monitoring the number of sheets in the drying oven according to claim 9, further comprising an execution module configured for comparing a count value of the number of sheets in the drying oven with an existence value of the number of sheets in the drying oven and executing a predetermined executive strategy according to a comparison result, wherein the predetermined executive strategy comprises giving an inventory mismatch alarm.

12. A management and control system of a drying oven, comprising a monitoring device according to claim 9.

13. A non-transitory machine-readable storage medium comprising instructions that when executed by a processer cause the processer to:
   acquiring sheet inlet signals and sheet outlet signals during transmission of the sheets, in which the sheet inlet signals include information about a number of sheets transmitted into the oven by a robot, and the sheet outlet signals include information about a number of sheets transmitted out of the oven by the robot; and
   calculating an actual number of sheets in the drying oven according to the sheet inlet signals and the sheet outlet signals,
   wherein the instructions are further executable to determine corresponding sheet inlet signals and corresponding sheet outlet signals of different ovens according to the types of the ovens before calculating the actual number of sheets in the drying oven according to the sheet inlet signals and the sheet outlet signals.

14. The non-transitory machine-readable storage medium according to claim 13, wherein the instructions are executable to compare a count value of the number of sheets in the drying oven with an existence value of the number of sheets in the drying oven and execute a predetermined executive strategy according to a comparison result, wherein the predetermined executive strategy comprises giving an inventory mismatch alarm.

* * * * *